United States Patent [19]

Lissau

[11] 4,313,471

[45] Feb. 2, 1982

[54] FLOW CONTROL

[75] Inventor: Frederic Lissau, Chicago, Ill.

[73] Assignee: Sloan Valve Company, Franklin Park, Ill.

[21] Appl. No.: 184,142

[22] Filed: Sep. 4, 1980

Related U.S. Application Data

[63] Continuation of Ser. No. 957,155, Nov. 2, 1978, abandoned, which is a continuation of Ser. No. 930,605, Aug. 3, 1978, abandoned.

[51] Int. Cl.$^3$ .................. B05B 15/02; F15D 1/02
[52] U.S. Cl. ........................................ 138/45; 138/46
[58] Field of Search ............... 138/40, 42, 43, 44, 138/45, 46; 239/533.13, 533.14, 542; 137/8

[56] References Cited

U.S. PATENT DOCUMENTS

| Re. 29,022 | 11/1976 | Spencer | 138/45 X |
|---|---|---|---|
| 2,460,407 | 2/1949 | Andrus | 138/45 X |
| 2,593,315 | 4/1952 | Kraft | 138/45 |
| 3,779,468 | 12/1973 | Spencer | 138/45 |

Primary Examiner—James E. Bryant, III
Attorney, Agent, or Firm—Kinzer, Plyer, Dorn & McEachran

[57] ABSTRACT

An automatic flow control for regulating the flow rate of fluids. The flow control has a first flow passage collapsible upon the application of fluid pressure to reduce the flow rate of the fluid, and a second flow passage carried by the collapsible first flow passage to provide a flow opening when the first passage is collapsed.

1 Claim, 9 Drawing Figures

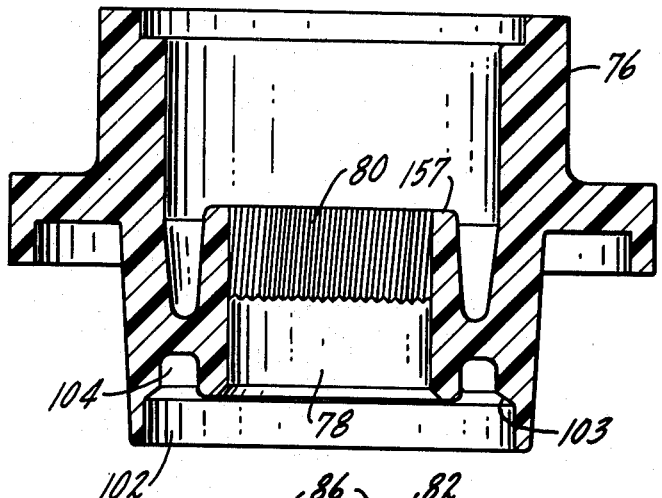
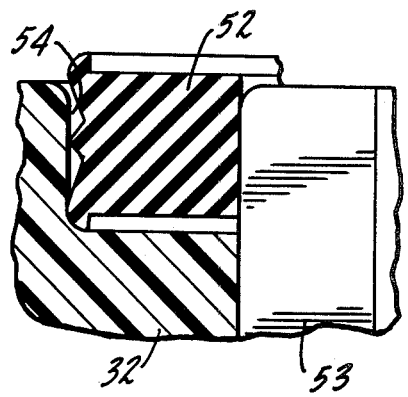
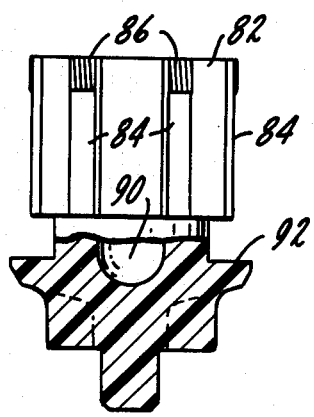
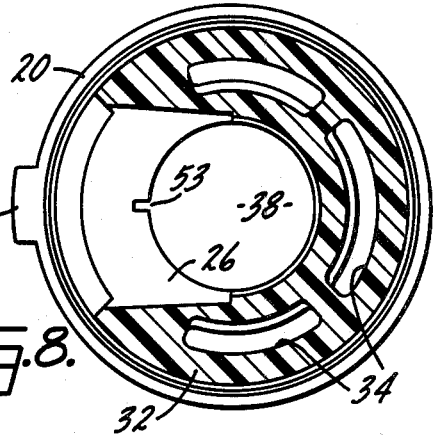
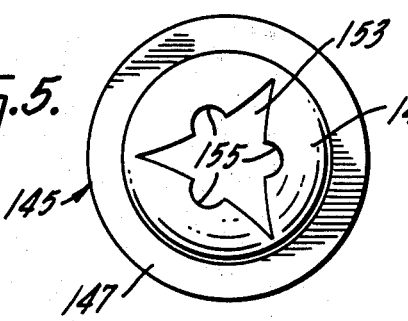
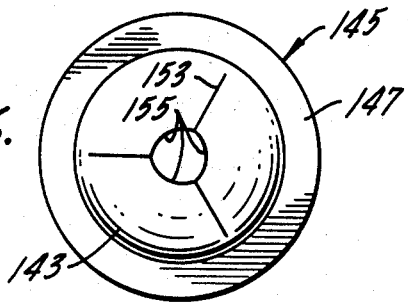
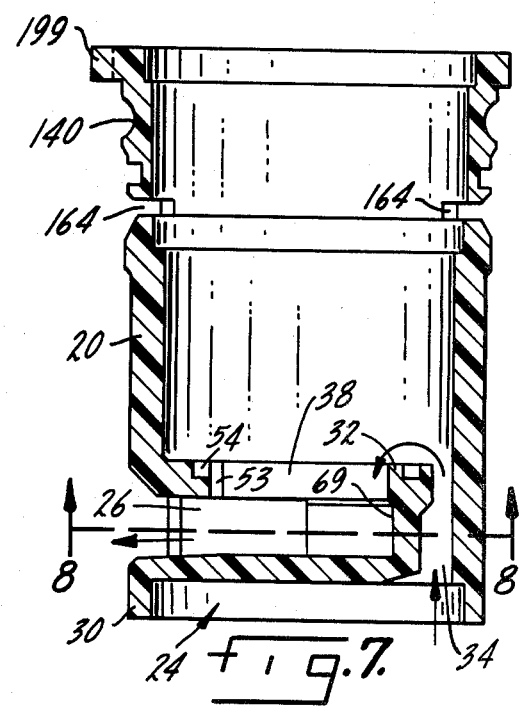

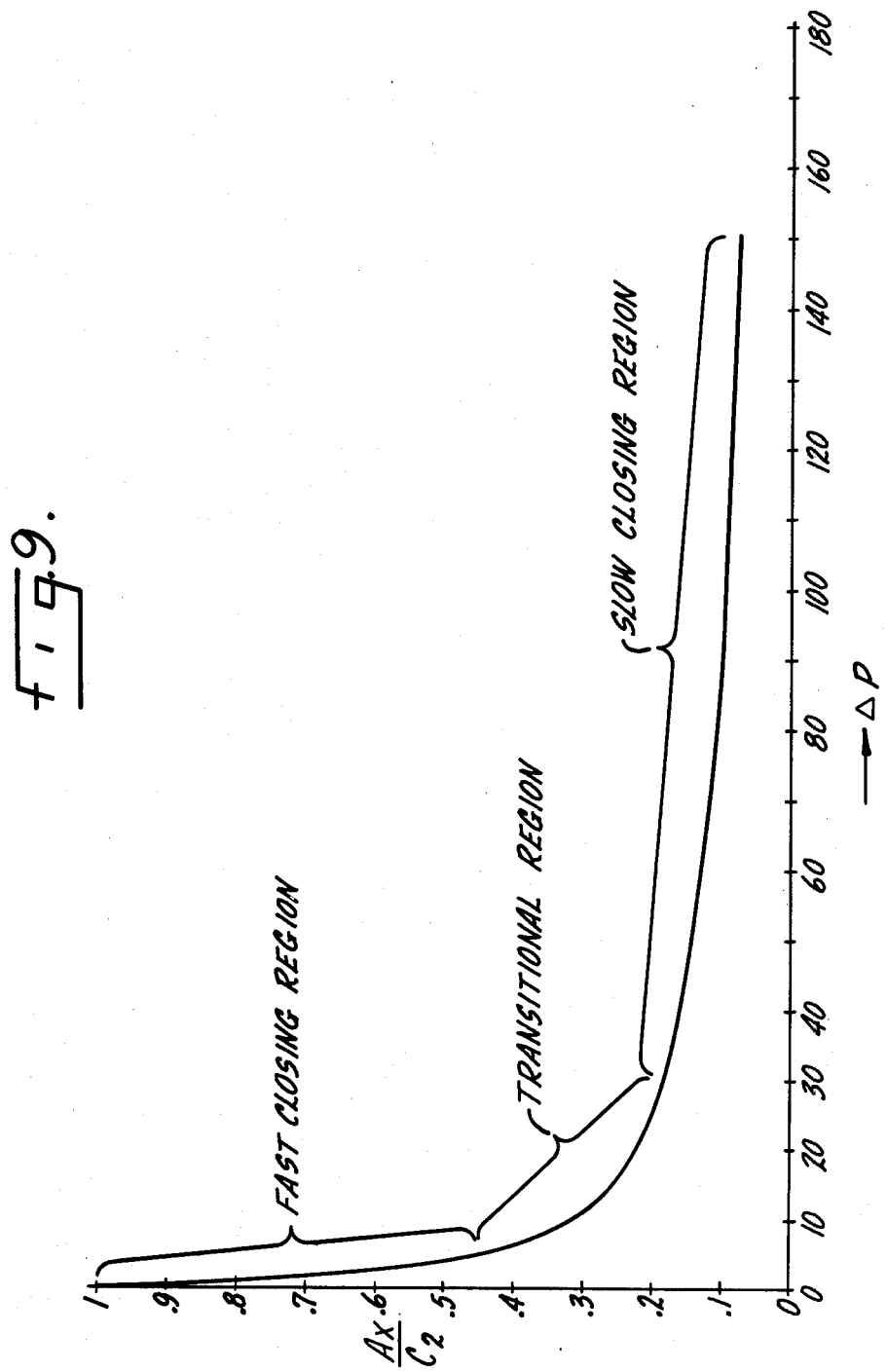

FLOW CONTROL

CROSS REFERENCE TO RELATED APPLICATIONS

This is a continuation of application Ser. No. 957,155 filed Nov. 2, 1978, now abandoned which was a continuation of Ser. No. 930,605 filed Aug. 3, 1978 now abandoned.

SUMMARY OF THE INVENTION

It is the purpose of the invention to provide an automatic flow control of a resilient material which will provide a substantially uniform flow rate through the flow control over a range of fluid pressures.

It is another purpose of the invention to provide a flow control with a variable orifice therethrough, which will change in area at a rate dependent upon the pressure region in which the flow control is operating.

Other purposes will appear in the ensuing specifications, drawings and claims.

BRIEF DESCRIPTION OF THE DRAWINGS

The invention is illustrated in the drawings wherein:

FIG. 2 is a partial cross section of the main valve seat and venting slot on an enlarged scale;

FIG. 3 is a cross section of the poppet valve support on an enlarged scale;

FIG. 4 is an enlarged side view in partial cross section of the poppet valve;

FIG. 5 is a bottom view of the flow control in the uncompressed position on an enlarged scale;

FIG. 6 is a bottom view of the flow control in one compressed position;

FIG. 7 is a cross-sectional view of the cartridge body on a reduced scale;

FIG. 8 is a sectional view of the cartridge body taken on line 8—8 of FIG. 7; and FIG. 9 is a graph showing the desired changes in the area of the flow control orifice versus changes in pressure.

DESCRIPTION OF THE PREFERRED EMBODIMENT

Figure 1:
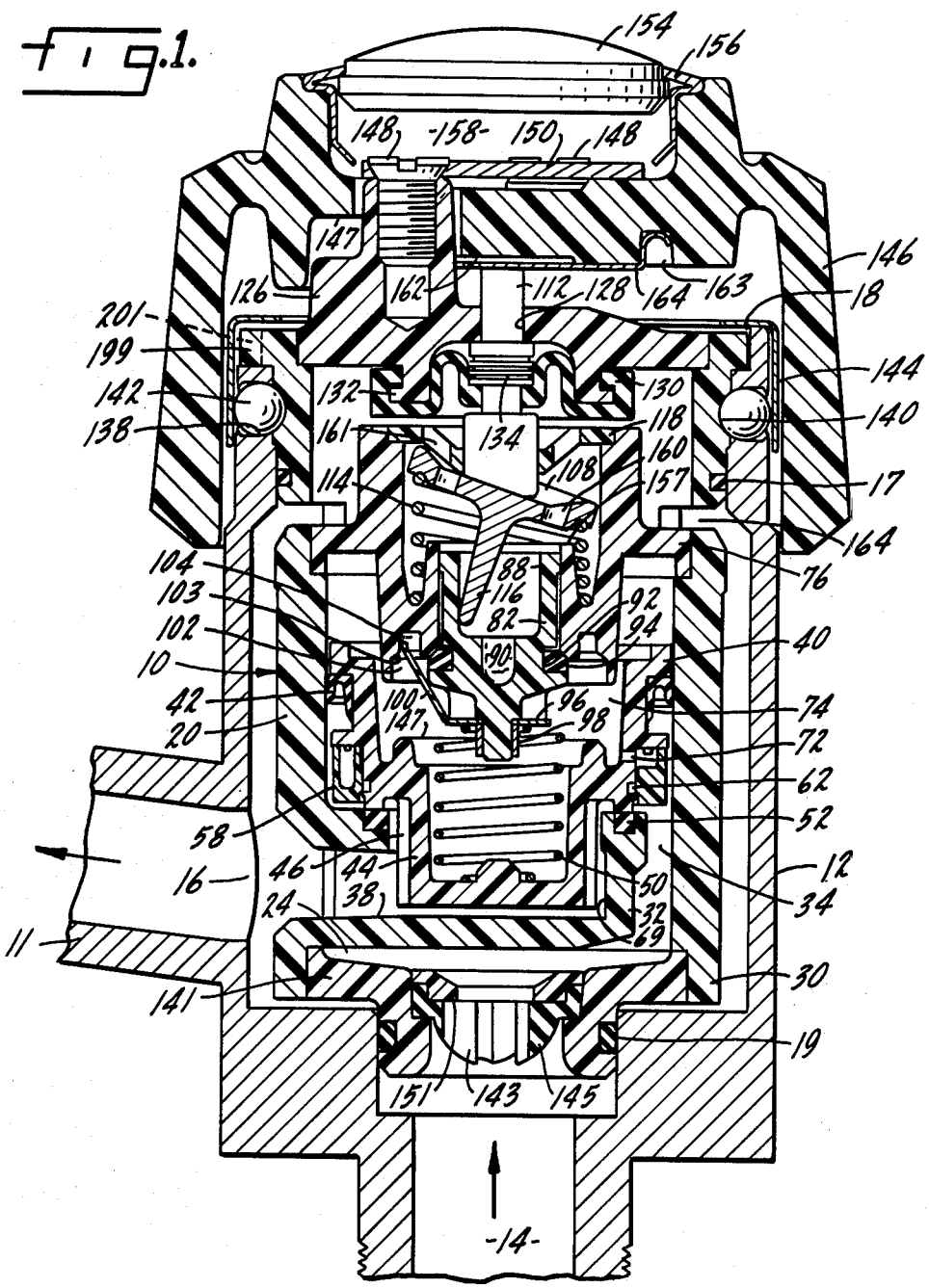
FIG. 1 is a cross section of the closed cold water faucet.

The control cartridge of this invention is designated by the numeral 10 and is removably mounted within a faucet casing 12. Following conventional practices, the faucet casing 12 is mounted to the rear of the lavatory deck (not shown) with the faucet spout 11 overhanging the sink.

As shown in FIG. 1, casing 12 is generally cylindrical in shape having a threaded inlet 14 for connection to a water supply line and an outlet 16 located in its side wall and opening to spout 11. Mounted through the circular top opening 18 of casing 12 is the removable control cartridge 10 for controlling the passage of water between the casing inlet 14 and outlet 16. Between cartridge 10 and casing 12 are seals 17 and 19 to prevent leakage.

The plastic cartridge body 20, generally cylindrical in shape, can be best seen in FIG. 7. Body 20 has an inlet 24 and outlet 26 aligning with casing inlet 14 and outlet 16, respectively. At the bottom of body 20 is an annular rim portion 30. Adjacent to rim portion 30 and integral with body 20 is a generally disc-shaped portion 32. As can be seen in FIG. 8, a plurality of slots 34 along the periphery of the disc portion 32 provide a flow passage from cartridge inlet 24 through disc 32. Axially centered within disc 32 is well 38. The bottom side wall of well 38 has an opening forming the cartridge outlet 26.

Piston 40, as shown in FIG. 1, is slidably mounted within cartridge body 20 and sealed thereon by a rubber cup-shaped seal 42. Piston 40 has a cylindrical portion 44 smaller in diameter than, and extending into, well 38. This difference in diameters, along with axially extending slots 46 appearing on the outer surface of piston 40, provide a flow passage through well 38 to outlet 26. A spring 50 normally biases piston 40 to seat on the main valve seat 52 positioned within an annular groove 54 in disc 32. As seen in FIG. 2, a venting slot 53 axially extends along disc portion 32 and provides venting means to prevent pressure buildup from popping seat 52 upwards upon the rising of piston 40.

Attached and sealed to the upper interior of cartridge body 20 is poppet support 76 of a shape most clearly seen in FIG. 3. A hollow opening 78 is centrally located in support 76 and an annular portion thereon is provided with slightly angled serrations 80. Slidably mounted within opening 78 is relief valve or poppet 82 having a plurality of vertical ribs 84 spaced around its outer periphery as shown in FIG. 4. A slightly angular serrated portion 86 for cooperation with support serrations 80 appears on the upper end of each rib 84. The upper end of poppet 82 has bore 88 and a coaxial second deeper and narrower bore 90. On the periphery of poppet 82 is groove 92 and fitted therein is poppet seal 94.

Spring 50 normally upwardly biases poppet 82 to seat against poppet support 76. A multipronged latch spring 96 is secured at the bottom of poppet 82 by retaining ring 98, while its prongs 100 latch against angular shelf 103 connecting the concentric grooves 102,104 in the bottom of poppet support 76.

Located within poppet support 76 is actuator 108 for unseating poppet 82. Actuator 108 has a post portion 116 extending into bore 88 and is normally biased by spring 114 to a tilted position against an angled bottom portion of stem 112. Preventing misalignment of stem 112 is stem guide 118 attached to poppet support 76. Attached to the top of the cartridge body 20 is cover 126. The top portion of operating stem 112 extends through opening 128 in cover 126. Rolling diaphragm seal 130, for sealing opening 128, is fitted around annular support member 132 protruding from bottom of cover 126. Appearing upon the intermediate portion of stem 112 are a plurality, typically three, of annular grooves 134 which allow diaphragm 130 to seal more effectively around stem 112 as the water pressure acts against diaphragm 130.

Appearing adjacent to the top of housing 12 are a plurality, typically six, of tapered holes 138 and adjacent to them is annular groove 140 in the outer surface of cartridge body 20. Within each hole 138 is a steel ball 142 which protrudes from the casing 12 into the cartridge 20 to prevent axial movement of the cartridge. A resilient metal cup-shaped retaining member 144 is fitted over the top of cartridge 20 and casing 12 and extends over balls 142 holding them in place.

A cup-shaped push button 146 is slidably and reciprocally mounted to cover 126 by means of screws 148 and mounting plate 150. The reciprocation of push button 146 in an upward direction is restrained by plate 150, while surface 147 terminates the push button's downward stroke as it contacts cover 126. A conventional top cap 154 with retaining member 156 is removably snapped into place in recess 158 of the top push button 146.

Appearing on the bottom of push button 146 is centrally located recess 162. A spring member 164 set in cavity 163 covers recess 162. It is noted that this arrangement prevents excessively hard forces applied to push button 146 by the user from direct transfer to stem 112 and other operative parts.

FLOW CONTROL

Attached to the rim portion 30 at the inlet end of cartridge 20 is lower cover 141 and attached thereto is annular support member 151. A resilient automatic flow control regulating unit 145, shown as cross-hatched for rubber, is inserted between member 151 and cover 141. Flow control 145 has a pressure exposed portion 143 which may be of a semispherical shape and a supporting rim portion 147.

As seen in FIG. 5, extending through the semispherical portion 143 of flow control 145, is a substantially triangular aperture 153. Located at the center of each of the sides of aperture 153 is a semicircular aperture or groove 155. When the water pressure at inlet 14 is low, for instance one p.s.i., the flow passage through aperture 153,155 will be substantially of the shape shown in FIG. 5. As the pressure is increased, flow control 145 will be correspondingly compressed causing triangle aperture 153 to first reduce in area as its sides converge toward its center. When the water pressure is approximately 20 p.s.i., flow control 145 will have been compressed to the shape approximated in FIG. 6. Under this condition, the flow passage will be defined by apertures 155 having now been converged at the center axis of the flow control.

The flow rate through the flow control is defined by the equation $Q = C_1 A x \sqrt{\Delta P}$; where Q is the flow rate, $C_1$ is a constant, Ax is the variable orifice of the flow control, and $\Delta P$ is the pressure drop through the flow control unit. Solving for Ax, $Ax = Q/C_1 \sqrt{\Delta P}$; however, for a constant flow rate it is possible to set $Q/C_1 = C_2$, therefore the changes in the variable area will be governed by the equation $Ax = C_2/\sqrt{\Delta P}$ or $Ax/C_2 = 1/\sqrt{\Delta P}$. Thus it can be seen that to obtain a constant flow rate, it is necessary that the change in the area (Ax) of the flow control orifice be inversely proportioned to the changes in $\sqrt{\Delta P}$.

In FIG. 9 a graph of $1/\sqrt{\Delta P} = Ax/C_2$ has been plotted to show the theoretically desired reduction in area of the orifice as the pressure increases. For purposes of clarity, the maximum area of Ax has been set at 1 square unit and $C_2$ has been set at 1.

For increases in pressure in the lower range of approximately 0 to 6 p.s.i., the valve of the orifice area (Ax) decreases at a rapid and fairly uniform rate. In a transitional range, approximately 6 to 20 p.s.i., the value of Ax decreases at a relatively moderate and variable rate. Above 20 p.s.i., the value of Ax changes at a slow and substantially uniform rate as the pressure increases.

To obtain the desired changes in the area of the flow control orifice, the flow control has been provided with a normally triangle-shaped aperture 153. The triangular shape is such that the initial compression of the flow control unit causes the cross-sectional area of the aperture 153 to be reduced at a relatively high and uniform rate. This is the result of adjacent sides at the vertex areas of the triangle quickly meeting to reduce the size of the opening, and to aid this action the sides of aperture 153 may be made concave relative to its central axis. This occurrence upon initial compress of the flow control is denoted as the "FAST CLOSING REGION" in FIG. 9.

With aperture 153 now distorted from its original substantially triangular shape, further increases in pressure cause opening 153 to decrease in area at a relatively moderate and variable rate. This action approximates the changes in area (Ax) shown in the "TRANSITIONAL REGION."

In the higher pressure ranges, the sides of triangular aperture 153 will have converged, thereby resulting in a substantially circular passage defined by grooves 155 as shown in FIG. 6. This circular shape is such that, upon increases in pressure, the reduction in area is at a relatively slow and uniform rate. This action is approximated in the "SLOW CLOSING REGION" of FIG. 9.

It is to be understood that the invention is not to be limited only to the combination of triangular and circular openings. Other shapes which quickly reduce in area upon compression can be substituted for the triangular shape, and shapes which slowly reduce upon compression can be substituted for the circular opening. The major importance is that a plot of the reduction of the area of the openings due to the compression by pressure substantially conforms to the curve of Ax.

After the inlet water has passed through flow control 145, it continues upward past disc portion 32 via disc slots 34 and reaches timing and filter mechanism 58, then through bypass hole 72 in piston 40 as shown in FIG. 1.

The timing mechanism, as well as the other rigid parts which make up the removable cartridge 10, may be made from a plastic material. In this regard it has been found that Noryl, a product of the General Electric Company, provides a suitable plastic material.

The flow of water from inlet 14 through timing mechanism 58 fills and pressurizes timing chamber 74. This results in the faucet's normally closed position shown in FIG. 1, and it is now ready for operation by the user.

In the case of a single inlet faucet rotation is prevented by key 199 on cartridge body 20 being held in keyway slot 201 cut into housing 12.

OPERATION

In operation, the user depresses push button 146 causing spring member 164 to force stem 112 and actuator 108 downward. Post 116 acts against relief valve poppet 82 causing seal 94 to move away from its seat on poppet support housing 76.

The prongs of latch spring 100 will expand outwardly as it follows poppet 82 on its downward travel. Spring 100 will expand to latch against angular shelf 103 to prevent an immediate return of poppet 82 to its seat. With poppet 82 in the open position, the small amount of water under pressure in timing chamber 74 is free to flow past ribs 84 in poppet 82, past actuator 108 or through actuator holes 160 and stem guide holes 161. The water flow continues around the outside of poppet support 76 and leaves the cartridge at a pair of slots 164 in cartridge body 20. The water then exits at housing outlet 16 through spout 11. With water from inlet 14 pressing upwards against the outer bottom surfaces of piston 40, and with timing chamber 74 now being vented, the timing piston 40 rises up from its valve seat 52. The inlet water passes seat 52, flows down slots 46 to the bottom of well 38 and out cartridge outlet 26 and casing outlet 16 to the faucet spout 11 for use by the user. Of particular importance is the restriction of flow through slots 46. This restriction maintains water pressure upstream of the restriction so that the pressure may continue to push upwards against the outer bottom surfaces of piston 40, thereby continuing the piston's upward travel off its seat. While piston 40 is in a position above its seat, water is supplied from inlet 14 to the user at spout 11.

When piston 40 has risen a sufficient distance, its annular rim 147 will bump latch spring 100, allowing spring 50 to return poppet 82 to its seat 94. With timing chamber 74 no longer vented through the poppet valve, its pressure increases to that of the supply line which communicates with chamber 74 through timing mechanism 58 and bypass hole 72. Piston 40 is pushed downward by the pressure in chamber 74. Since well 38 is vented, the force of water pressure acting upward on the bottom of the piston is not as great as the force acting in the downward direction, and piston 40 is caused to move downward toward seat 52. As piston 40 moves close to seat 52, a pressure drop suddenly occurs by the restricted flow of water in the area between seat 52 and well 38. This sudden pressure drop causes a quick addition to the closing force acting on piston 40 producing a sharp cutoff of water flow to the outlet.

A self-cleaning feature is provided by undercut 69 in cartridge body 20. As piston 40 returns to its seat, any foreign deposits on the piston or the body are pushed down into the undercut area 69. Thereafter, the deposits are free to be flushed through outlet 26, thereby preventing an excessive buildup of foreign matter which otherwise could affect the operation of the faucet.

As previously noted, the timing of the closing of main seat 52 is governed by timing mechanism 58. A cycle of 8-10 seconds in duration is normally sufficient for the user to wash his hands. It is to be understood, however, that the invention should not be limited to any of the specific information given.

Of particular importance is the water conserving non-hold-open feature of the faucet which allows water to flow for only the predetermined period, regardless of the length of time the push button is held down. As the tilted actuator 108 is forced downward by the depression of the push button, actuator 108 remains in the tilted position until its outer periphery contacts annular rim 157 on poppet support 76. When this occurs, actuator 108 is caused to be rotated to an axial or untilted position aligning post 116 with deep bore 90 at the end of the post's stroke.

To prevent excessive wear on poppet 82 by the repeated action of the tip of post 116, poppet 82 and poppet support 76 have been provided with serrated portions 86 and 80, respectively. The outer diameter of poppet 82 is such that when the poppet and support 76 are axially aligned, serrations 80 and 86 are spaced apart and not engaged. However, since post 116 moves along a nonaxial line on its downward stroke, the serrations will be cocked into engagement, thereby slightly rotating poppet 82 during its downward travel. Since poppet 82 is returned upward by the concentric forces of spring 50 and the water pressure in chamber 74, the serrations will not be engaged in the upward stroke and the poppet will not be caused to rotate back to its previous position. Each stroke of post 116, therefore, will rotate poppet 82 so that post 116 will act upon a different location of poppet 82 on successive strokes. This rotation enables poppet 82 to wear evenly further adding to the reliability of the faucet.

It is likely that some users will use a quick depression of the push button to activate the faucet. Under those circumstances relief valve poppet 82 would move only a short distance and quickly return to the closed position, causing the faucet to operate falsely. Precautions have been made in anticipation of any quick short depressions by the user. As previously described, latch spring 100 grips against the angular shelf 103. The latch spring 100 is positioned to grip even upon quick strokes of the push button. This latching effect will hold poppet 82 in the open position and allow timing chamber 74 to be fully vented. Operation for the full time cycle of 8 to 10 seconds will therefore result. It is noted that groove 102 should be made of sufficient depth to prevent latch spring 100 from moving to a position where it may catch on the bottom of support 76 and thereby cause the relief valve poppet to become stuck in the open position.

The water conserving faucet has a self-closing and non-hold-open features which, after a predetermined period of time, automatically shut off flow regardless of a continued depression of the push button. The faucet is provided with an automatic flow regulator for regulating the water flow to a relatively constant value regardless of the variation in the inlet water pressures. The invention, therefore, provides both a constant period of water flow and constant volume of water for each use of the faucet.

All of the foregoing features are combined into a single removable unit with the various elements constructed of the cartridge type so they can be readily replaced for servicing the same.

The cartridge 10 may be a replacement throwaway item so that after whatever period of time and use is required to clog, wear, or otherwise make the cartridge inoperative of or needing repair, the entire cartridge may be removed and replaced. This only requires that the push button 146 be removed by first taking off the top cap 154, removing the screws 148, and lifting off the push button. Then the retainer 144 is removed and the cartridge 10 in its entirety may be lifted out of the housing and replaced. The cartridge housing with the top closure 126 securely mounted in the upper end thereof, and either with or without the FIG. 2 mixing valve in the lower end thereof, is an intergral composite unit. When a new cartridge is inserted, the projecting pilot on the end of the lower cover 141, either with or without the mixing valve, will guide the insertion of the cartridge until the key 199 fits in its slot 201 and the retainer, screws, push button and cover reassembled. All of this can be done by unskilled labor which greatly reduces the expense, service, replacement, etc.

Whereas the preferred form of the invention has been shown and described herein, it should be realized that there may be many modifications, substitutions and alterations thereto.

The embodiments of the invention in which an exclusive property or privilege is claimed is defined as follows:

1. In an automatic water flow control device in the form of an annulus made of a distortable material having the general characteristics of rubber as to flexibility and distortability and having a generally annular supporting rim portion for use in mounting the flow control device, the rim bounding a generally central flexing convex-concave portion, convex on one side and concave on the other, a generally centrally located, generally polygonal shaped aperture in the central portion forming a first flow passage, each of the sides of the polygon having a generally curvilinear cross-sectional groove therein constructed and arranged such that when the incoming water pressure is applied to the convex side of the central portion causing the sides thereof to converge inwardly and to contact each other, the grooves will be brought together thereby forming a constant cross-section second flow passage with a generally uniform flow therethrough, the aperture forming the first flow passage being generally triangular in cross-section in its relaxed state and thereby having three sides, each of which has a generally curvilinear cross-sectional groove formed intermediate the ends thereof.

* * * * *